(12) United States Patent
Yang et al.

(10) Patent No.: US 12,026,895 B2
(45) Date of Patent: Jul. 2, 2024

(54) MONOCULAR VISION-BASED METHOD FOR MEASURING DISPLACEMENT AND TRAJECTORY OF PLANAR MOTION

(71) Applicants: Guizhou University, Guizhou (CN); National Institute of Metrology, China, Beijing (CN)

(72) Inventors: Ming Yang, Guiyang (CN); Chenguang Cai, Beijing (CN); Zhihua Liu, Beijing (CN); Wen Ye, Beijing (CN); Ying Zhang, Beijing (CN); Yan Xia, Beijing (CN); Lei Fu, Guiyang (CN)

(73) Assignees: Guizhou University, Guiyang (CN); National Institute of Metrology, China, Beijing (CN)

( * ) Notice: Subject to any disclaimer, the term of this patent is extended or adjusted under 35 U.S.C. 154(b) by 396 days.

(21) Appl. No.: 17/507,968

(22) Filed: Oct. 22, 2021

(65) Prior Publication Data
US 2022/0044422 A1 Feb. 10, 2022

(30) Foreign Application Priority Data
Oct. 22, 2020 (CN) .......................... 202011139972.0

(51) Int. Cl.
 *G06T 7/246* (2017.01)
 *G06T 7/80* (2017.01)
 *G06V 10/25* (2022.01)

(52) U.S. Cl.
 CPC ............... *G06T 7/246* (2017.01); *G06T 7/80* (2017.01); *G06V 10/25* (2022.01); *G06T 2207/30241* (2013.01)

(58) Field of Classification Search
 CPC . G06T 7/246; G06T 7/80; G06T 2207/30241; G06T 2207/10016; G06V 10/25; G06V 2201/06; G06V 10/225; G06V 10/44; G06V 20/52; G01C 11/00; G01M 7/06
 See application file for complete search history.

(56) References Cited

FOREIGN PATENT DOCUMENTS

| CN | 109632085 A | 4/2019 |
|---|---|---|
| CN | 110672040 A | 1/2020 |

OTHER PUBLICATIONS

Ye, Zhen ("An Improved Subpixel Phase Correlation Method with Application in Videogrammetric Monitoring of Shaking Table Tests") Phomogrammetric Engineering & Remote Sensing vol. 84, No. 9 (Year: 2018).*

* cited by examiner

*Primary Examiner* — Molly Wilburn

(57) ABSTRACT

A monocular vision-based method for measuring displacement and trajectory of planar motion. In this method, a sequence image of a motion of a high-contrast feature mark fixed on a moving plane to be measured is collected using a camera. A sub-pixel coordinate of a feature edge of a linear motion of the sequence in an X direction and a Y direction is extracted using a sub-pixel edge detection method, and the sub-pixel coordinate is converted into a corresponding world coordinate. The world coordinate of the feature edge is fitted based on a least squares principle to obtain a straight line of the feature edge to realize decoupling measurement of a displacement in the X direction and the Y direction. The planar motion trajectory is obtained through measuring the displacement in the X direction and the Y direction.

4 Claims, 4 Drawing Sheets

MONOCULAR VISION-BASED METHOD FOR MEASURING DISPLACEMENT AND TRAJECTORY OF PLANAR MOTION

CROSS-REFERENCE TO RELATED APPLICATIONS

This application claims the benefit of priority from Chinese Patent Application No. 202011139972.0, filed on Oct. 22, 2020. The content of the aforementioned application, including any intervening amendments thereto, is incorporated herein by reference in its entirety.

TECHNICAL FIELD

The application relates to motion measurement, and more particularly to a monocular vision-based method for measuring a displacement and a trajectory of a planar motion.

BACKGROUND

The displacement and trajectory measurement of planar motion has been widely used in pose estimation, inertial navigation and structure safety test of bridges and buildings. The planar motion measurement is the basis for measuring the multi-degree-of-freedom motion, and the measurement precision directly affects the overall performance of the system or device in practical engineering applications. The precision for measuring the displacement and trajectory of the planar motion has to be improved, so as to meet the increasing demand for high-precision measurement in practical engineering applications. Therefore, it is necessary to study a method for precisely measuring the displacement and trajectory of the planar motion.

At present, the commonly used methods for measuring the displacement and trajectory of the planar motion include the laser interferometric method and the sensor-based measuring method. The laser interferometric method based on Doppler velocity measurement and laser interference principle has strong anti-interference ability, good dynamic performance, wide measurement frequency range and high linearity, and can realize a high-precision measurement of the displacement and trajectory of the planar motion. However, the measurement system of the interferometric method is of high complexity, high cost, and poor flexibility, and is difficult to be used for measuring the low-frequency motion with a large displacement range. The sensor-based measuring method merely requires a two-axis or three-axis vibration sensor to measure the displacement and trajectory of the planar motion. This method has simple measurement system, low cost, high flexibility and high efficiency. Nevertheless, the frequency of the sensor itself limits the precision of the measurement. Whereas the monocular vision method has high efficiency, high flexibility, high precision and low cost, and the existing monocular vision method is able to meet a measurement precision of up to 10 μm in the displacement measurement, which is being widely used in practical engineering applications. Therefore, the monocular vision method can be used to measure the displacement and trajectory of the planar motion. Since any planar motion can be decomposed into linear motions in the X and Y directions, the displacement and trajectory of the planar motion can be obtained through decoupling the motion displacement of the planar motion in in the X and Y directions using the monocular vision method, which improves the measurement precision and reduces the complexity and cost of the measurement system at the same time, and has a high flexibility.

In view of the problems that the existing method for measuring the displacement and trajectory of the planar motion has a measurement system of high complexity, poor flexibility, high cost and limited measurement range, and fails to meet the requirement of the low-frequency and high-precision measurement, the present disclosure provides an efficient, precise, flexible and low-cost monocular vision-based measurement method. A decoupling measurement of the planar motion based on the monocular vision converts the measurement of a multi-component planar motion into the measurement of a single-component linear motion, which improves the metrological traceability of the monocular vision method, and is the basis for the measurement of a six-degree-of-freedom motion.

SUMMARY

To solve the problems that the existing method for measuring the displacement and trajectory of the planar motion has a measurement system of high complexity, poor flexibility, high cost and limited measurement range, and fails to meet the requirement of the low-frequency measurement, this disclosure provides an effective and flexible method for accurately measuring a displacement and a trajectory of a planar motion, comprising:
(I) collecting a sequence image of a motion of the high-contrast feature mark;
fixing a high-contrast feature mark on a working surface of a low-frequency two-component shaker; collecting enough sequence images of a motion of the high-contrast feature mark using a camera, to ensure that a displacement of the planar motion can be precisely measured;
(II) extracting a sub-pixel coordinate of a feature edge of a linear motion of the sequence image in an X direction and a Y direction;
template matching is adopted to determine a region of interest in the sequence image of the high-contrast feature mark; extracting a sub-pixel coordinate of a feature edge point in the region of interest using a Zernike moment-based sub-pixel edge detection method; and according to a relationship between a pixel coordinate and a world coordinate of an image determined through calibration using the camera, converting the sub-pixel coordinate of the feature edge into the world coordinate;
(III) solving the displacement of the feature edge of the linear motion in the X direction and the Y direction;
respectively performing least-square fitting on the world coordinate of the feature edge point of the linear motion in the X direction and Y direction to obtain a corresponding fitting straight line; selecting a feature edge of the motion of the sequence image of high-contrast feature mark at a zero position of the working surface as a zero-displacement reference edge; by calculating a distance between the feature edge of the linear motion of the sequence image and the corresponding edge of the reference image to obtain a displacement of the motion of the feature edge in the X direction and the Y direction; and
(IV) solving the trajectory of the planar motion
obtaining the corresponding peak value and the initial phase of the displacement, further solving to obtain the trajectory of the planar motion, based on the measured motion displacement of the feature edge in the X and Y directions fitted using a sine-approximation method.
Specifically, the method comprises the following steps:

(S1) fixing a high-contrast feature mark consisting of a rectangle and four circles around the rectangle on a working surface of a low-frequency two-component shaker, such that a displacement of the rectangle in the high-contrast feature mark is consistent with a displacement of the wording surface; and collecting a sequence image of a motion of the high-contrast feature mark using a camera;

(S2) extracting a sub-pixel coordinate of a feature edge of a linear motion of the sequence image of the high-contrast feature mark in an X direction and a Y direction using a Zernike moment-based sub-pixel edge detection method; and according to a relationship between a pixel coordinate and a world coordinate of an image determined through calibration using the camera, converting the sub-pixel coordinate of the feature edge into a corresponding world coordinate;

(S3) respectively performing least-square fitting on the world coordinate of the feature edge of the linear motion in the X direction and Y direction to obtain a straight line of the feature edge; selecting a feature edge of the motion of the of the sequence image of high-contrast feature mark at a zero position of the working surface as a zero-displacement reference edge; calculating a distance between the feature edge of the linear motion of the sequence image and the zero-displacement reference edge to obtain a displacement of the working surface in the X direction and a displacement of the working surface in the Y direction; and (S4) obtaining a planar motion trajectory of the working surface according to the displacement of the working surface in the X direction and the displacement of the working surface in the Y direction; and saving and displaying a measurement result of the displacement and the planar motion trajectory of the working surface.

In some embodiments, the extraction of the feature edge of the linear motion of the sequence image in the X direction and the Y direction comprise:

(1) determining a rectangular region in the sequence image of the high-contrast feature mark;

wherein template matching is adopted to determine four circular regions in the sequence image of the high-contrast feature mark to improve stability and precision in extracting the feature edge of the linear motion; the rectangle is located in a region of interest formed by centers of the four circular regions; and the feature edge is extracted in the region of interest to avoid a disturbance from an edge with similar background;

(2) extracting a sub-pixel of an edge point of a long edge and a short edge of the rectangle;

extracting the edge point of the long edge and the short edge of a pixel-level rectangle of a sequence image $F_j(x,y)$ of the motion of the high-contrast feature mark using Canny operator, where j=1, 2, . . . , N, and N is the number of collected sequence image;

obtaining a position error compensation of the long edge and the short edge of the rectangle through calculating Zernike moment of the sequence image $F_j(x,y)$ to obtain a sub-pixel coordinate of the long edge and the short edge of the rectangle; and converting the sub-pixel coordinate of the long edge and the short edge of the rectangle into a corresponding world coordinate according to the relationship between the pixel coordinate and the world coordinate of the image; and (3) fitting the feature edge of the linear motion in the X direction and the Y direction;

respectively fitting the world coordinate of the feature edge of the X direction and the Y direction based on the least squares principle to obtain a straight line $\{l_{j, X}\}$ of the feature edge of the linear motion in the X direction and a straight line $\{l_{j, Y}\}$ of the feature edge of the linear motion in the Y direction, where the sub-pixel coordinate of the long edge and the short edge of the rectangle is the feature edge of the linear motion in the X direction and the Y direction, respectively, and $l_{j, X}$ and $l_{j, Y}$ are equivalent edges of two long edges and two short edges of the rectangle in the sequence image $F_j(x,y)$, respectively; and obtaining a straight line $l_{r, X}$ of the feature edge of linear motion in the X direction and a straight line $l_{r, Y}$ of the feature edge of linear motion in the Y direction of an image $F_r(x,y)$ of the high-contrast feature mark at the zero position of the working surface.

In some embodiments, a motion of the working surface of the low-frequency two-component shaker is obtained by decoupling an edge displacement in the X direction and the Y direction; and the planar motion is described as a displacement $s_X(t)$ in the X direction and a displacement $s_Y(t)$ in the Y direction:

$$\begin{cases} s_X(t) = \hat{s}_X \cos(\omega_v t + \varphi_X) \\ s_Y(t) = \hat{s}_Y \cos(\omega_v t + \varphi_Y) \end{cases}; \quad (1)$$

where, $\omega_v$ is an angular frequency of vibration; $\hat{s}_X$ and $\hat{s}'_Y$ are peak values of the displacement $s_X(t)$ and the displacement $s_Y(t)$, respectively; $\varphi_X$ and $\varphi_Y$ are initial phases of the displacement $s_X(t)$ and the displacement $s_Y(t)$, respectively;

the straight line $l_{r, X}$ and the straight line $l_{r, Y}$ of the feature edge of the image $F_r(x,y)$ are selected as the zero-displacement reference edge; a distance $d_{j, X}$ between the straight line $l_{j, X}$ of the feature edge of the sequence image $F_j(x,y)$ and a corresponding edge of the mark image $F_r(x,y)$ is calculated as the displacement $s_X(t_j)$ at a collecting moment $t_j$; a distance $d_{j, Y}$ between the straight line $l_{j, Y}$ of the feature edge of the sequence image $F_j(x,y)$ and a corresponding edge of the mark image $F_r(x,y)$ is calculated as the displacement $s_Y(t_j)$ at the collecting moment $t_j$.

In some embodiments, the displacement $s_X(t_j)$ and the displacement $s_Y(t_j)$ at the collecting moment $t_j$ are respectively fitted using a sine-approximation method shown as follows:

$$\begin{cases} s_X(t_j) = A_X \cos(\omega_v t_j) - B_X \sin(\omega_v t_j) + C_X \\ s_Y(t_j) = A_Y \cos(\omega_v t_j) - B_Y \sin(\omega_v t_j) + C_Y \end{cases}; \quad (2)$$

wherein parameters $A_X$, $B_X$, $C_X$, $A_Y$, $B_Y$ and $C_Y$ are obtained by solving N corresponding equations, respectively; the peak value $\hat{s}_X$ and the initial phase $\varphi_X$ of the displacement of the planar motion in the X direction and the peak value $\hat{s}_Y$ and the initial phase $\varphi_Y$ of the planar motion in the Y direction are obtained as follows:

$$\begin{cases} \hat{s}_X = \sqrt{A_X^2 + B_X^2}, \varphi_X = \arctan(B_X/A_X) \cdot 180/\pi \\ \hat{s}_Y = \sqrt{A_Y^2 + B_Y^2}, \varphi_Y = \arctan(B_Y/A_Y) \cdot 180/\pi \end{cases}; \quad (3)$$

a phase difference $P_D$ is defined as follows:

$$P_D = |\varphi_X - \varphi_Y| \quad (4);$$

when the phase difference $P_D$ is 0° or 180°, the planer motion provided by the working surface has a linear trajectory; if and only if $\hat{s}_X = \hat{s}_Y$ and the phase difference $P_D$ is 90°, the planar motion provided by the working surface has a circular trajectory; and planar motions under other conditions all have an elliptical trajectory.

In some embodiments, a device for implementing the method mentioned above, comprising:
- a low-frequency two-component shaker;
- a working surface;
- a high-contrast feature mark;
- an illumination device;
- a camera;
- a fixing device;
- an image transmission device; and
- an image processing and displaying unit;
- where the working surface of the low-frequency two-component shaker is configured to provide a motion of any trajectory in a plane; the high-contrast feature mark is fixed on the working surface, such that a motion of the high-contrast feature mark is consistent with a motion of the working surface; the illumination device is configured to provide illumination for the camera; the fixing device is configured for fixing the camera to allow an optical axis of the camera to be perpendicular to the high-contrast feature mark; the camera is configured to collect the sequence image of motion of the high-contrast feature mark; the image transmission device is configured to transmit the sequence image collected by the camera; the image processing and displaying unit is configured to process the sequence image collected by the camera, save and display a measurement result of the displacement and the trajectory of the planar motion.

The beneficial effects of a method for measuring a displacement and a trajectory of a planar motion provided herein are described as follows.

(1) This method is stable, reliable and practical, and can measuring the displacement and trajectory of the planar motion with different frequency and displacement range at the same time.

(2) The measuring process of this method is simple, flexible and effective, and the system for this method has a low cost. A camera can meet the requirement for measuring the planar motion in different frequency ranges.

(3) A displacement of the planar motion is accurately measured through decoupling measuring displacements of the planar motion in the X and Y directions.

(4) This method is one of the methods for measuring the planar motion, and can realize a high-precision measurement of the displacement and trajectory of the planar motion within a certain frequency range.

(5) This method decouples the measurement of the displacement and trajectory of the planar motion into the measurement of the displacements in the X and Y directions, which improves the metrological traceability of the monocular vision-based displacement measurement of the planar motion, and provides an effective way for accurately measuring a six-degree-of-freedom movement at the same time.

DETAILED DESCRIPTION OF EMBODIMENTS

To solve the problems that the existing method for measuring the displacement and trajectory of the planar motion has a measurement system of high complexity, poor flexibility, high cost and limited measurement range, this disclosure provides a monocular vision-based method for measuring displacement and trajectory of planar motion. Through decoupling the motion displacement of the planar motion in in the X and Y directions, this method realizes the high-precision measurement of the displacement and trajectory of the planar motion in the low frequency range. The following describes this disclosure in detail with reference to the drawings and specific embodiments.

Figure 1:
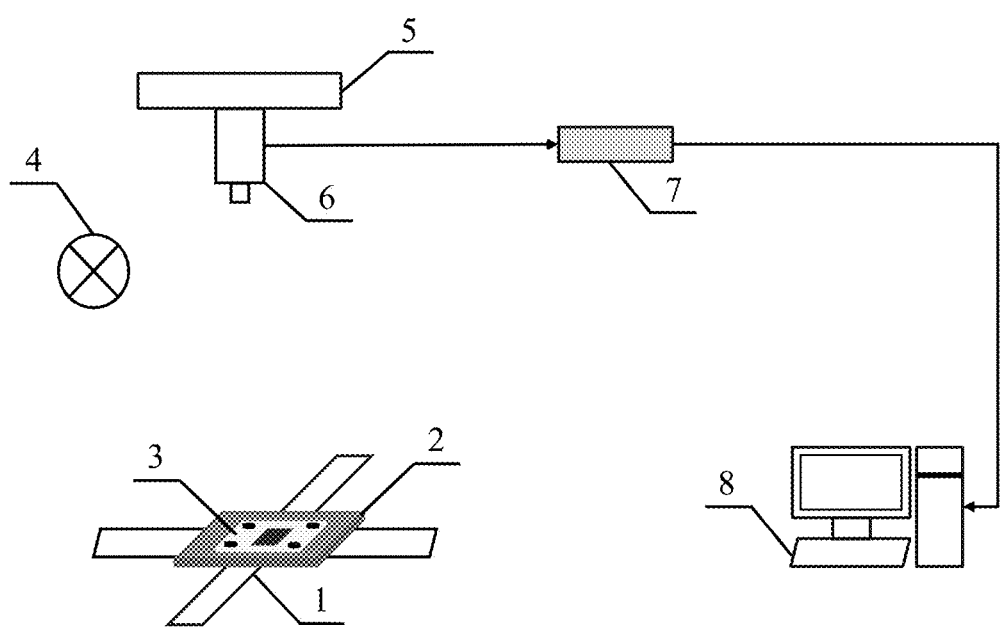
FIG. 1 schematically depicts a device for implementing a method for measuring a displacement and a trajectory of a planar motion based on monocular vision in accordance with an embodiment of the present disclosure.

FIG. 1 schematically depicts a device for implementing a method for measuring a displacement and a trajectory of a planar motion based on monocular vision. The device includes a low-frequency two-component shaker 1, a working surface 2, a high-contrast feature mark 3, an illumination device 4, a fixing device 5, a camera 6, an image transmission device 7, and an image processing and displaying unit 8. The working surface 2 of the low-frequency two-component shaker 1 is configured to provide a motion of any trajectory in a plane. The high-contrast feature mark 3 is fixed on the working surface, such that a motion of the high-contrast feature mark 3 is consistent with a motion of the working surface 2. The illumination device 4 is configured to provide illumination for the camera 6. The fixing device 5 is configured for fixing the camera 6 to allow an optical axis of the camera 6 to be perpendicular to the high-contrast feature mark 3. The camera 6 is configured to collect the sequence image of motion of the high-contrast feature mark 3. The image transmission device 7 is configured to transmit the sequence image collected by the camera. The image processing and displaying unit 8 is configured to process the sequence image collected by the camera 6, save and display a measurement result of the displacement and the trajectory of the planar motion.

Figure 2:
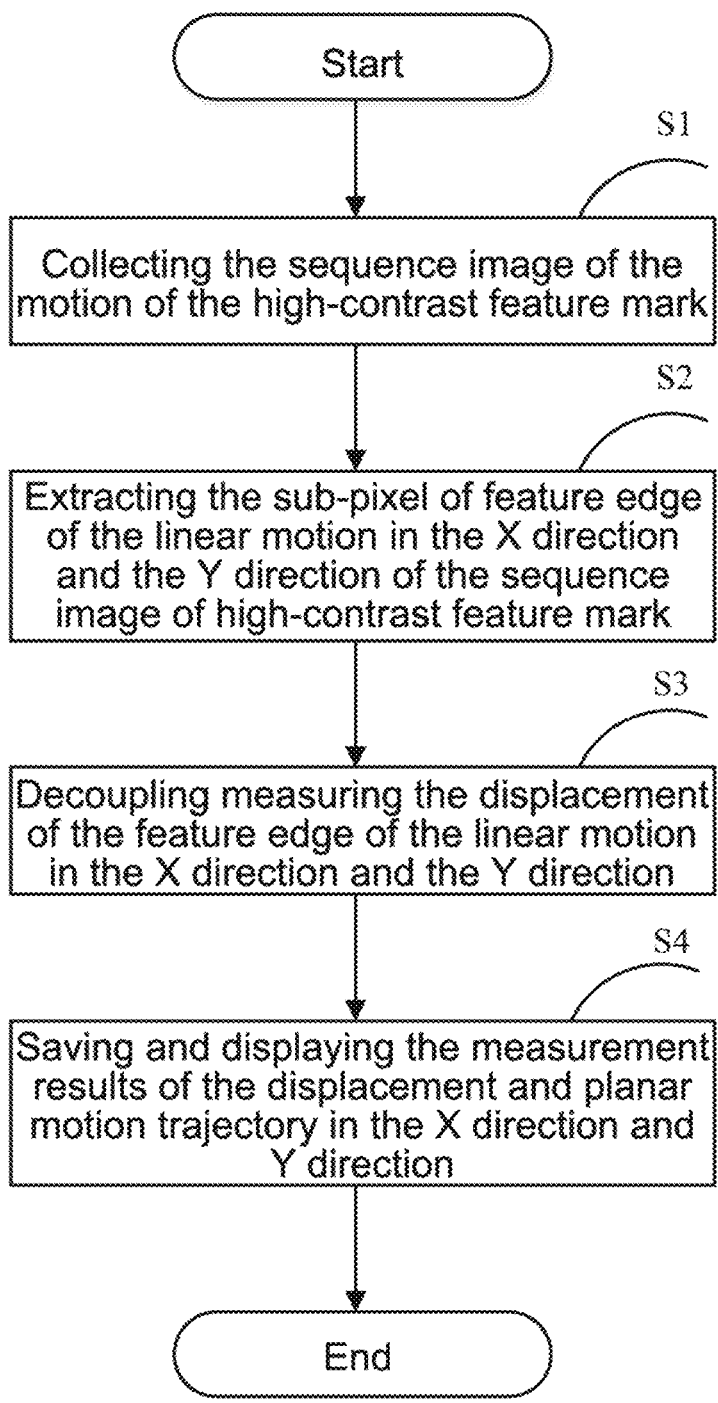
FIG. 2 is a flow chart for measuring the displacement and the trajectory of the planar motion based on monocular vision.

FIG. 2 is a flow chart for measuring the displacement and the trajectory of the planar motion based on monocular vision. The measurement method provided herein mainly includes following steps.

(S1) A high-contrast feature mark is fixed on a working surface of a low-frequency two-component shaker. Enough sequence images of a motion of the high-contrast feature mark are collected using a camera.

(S2) A sub-pixel coordinate of a feature edge of a linear motion of the sequence image in an X direction and a Y direction is extracted which includes the following steps. The region of interest in the mark image is determined; a sub-pixel of an edge point of a long edge and a short edge of the rectangle in the region of interest is extracted. The world coordinate of the feature edge point of the linear motion in the X direction and the Y direction is solved.

(S3) The solution of the displacement of the motion of the feature edges in the X direction and the Y direction includes the following steps. The world coordinates of the feature edge of the linear motion in the X direction and the Y direction are fitted, respectively, based on a least squares principle to obtain a straight line of the feature edge. By calculating a distance between the feature edge of the linear motion in the X direction and the Y direction of the sequence image and the reference edge of the sequence image of the high-contrast feature mark at a zero position of the working surface to obtain a displacement of the working surface in the X direction and a displacement of the working surface in the Y direction.

(S4) The planar motion trajectory is solved as follows. The displacement of the motion in the X direction and the Y direction is fitted based on the sine approximation method, respectively, to obtain the peak value and initial phase of the corresponding displacement, so as to obtain the planar motion trajectory.

Figure 3:
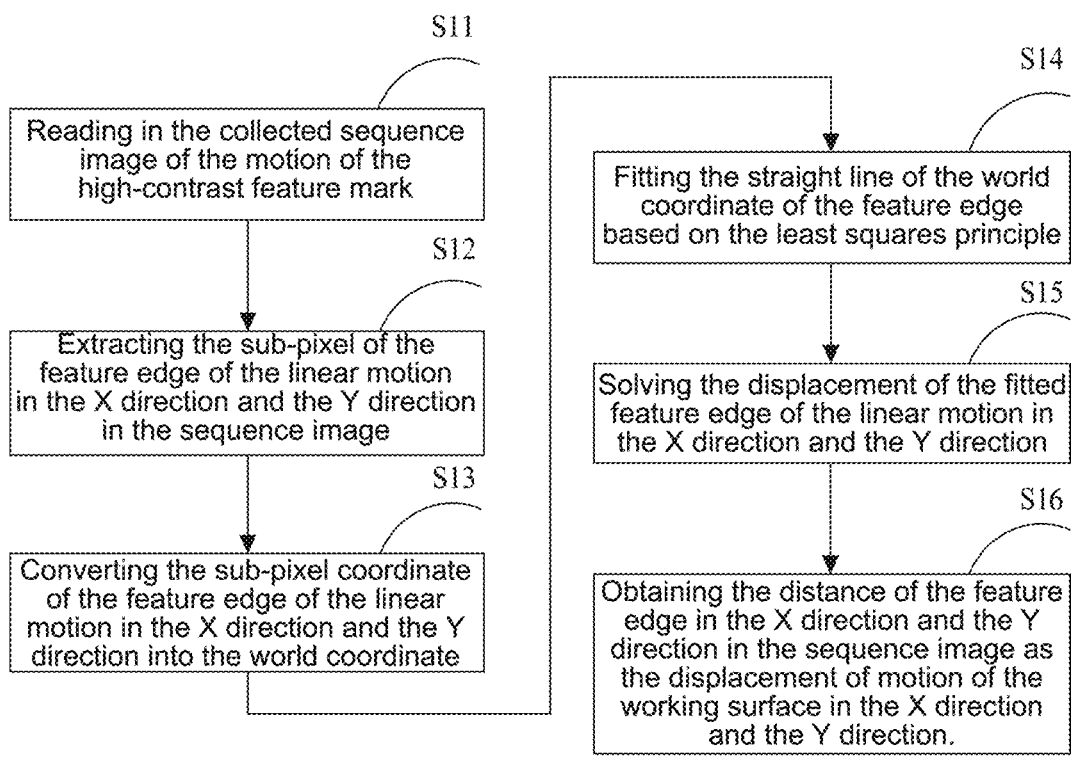
FIG. 3 is a flow chart of a decoupling measurement of a displacement of the planar motion based on monocular vision.

FIG. 3 is a flow chart of a decoupling measurement of a displacement of the planar motion based on monocular vision. The method provided herein includes the following steps.

(S11) The collected sequence image of the motion of the high-contrast feature mark is read in.

(S12) The sub-pixel coordinate of a feature edge of a linear motion of the sequence image in an X direction and a Y direction is extracted using a Zernike moment-based sub-pixel edge detection method.

(S13) According to a relationship between a pixel coordinate and a world coordinate of an image determined through calibration using the camera, the extracted sub-pixel coordinate is converted into the world coordinate.

(S14) The world coordinates of the feature edge of the linear motion in the X direction and Y direction are fitted based on a least squares principle to obtain a straight line of the feature edge.

(S15) The feature edge in the X direction and the Y direction of the sequence image of the high-contrast feature mark at a zero position of the low-frequency two-component shaker is selected as a zero-displacement reference edge. A distance between the feature edge in the X direction and the Y direction of the sequence image and the zero-displacement reference edge is calculated.

(S16) The distance of the feature edge in the X direction and the Y direction in the sequence image is the displacement of motion of the working surface in the X direction and Y direction, respectively.

The specific parameters of the device provided herein are described as follows. The low-frequency two-component shaker is of the frequency range from 0.01 to 100 Hz and the peak value displacement of 200 mm at the peak. The high-contrast feature mark is a metal plate consisted of a rectangle with the size of 60 mm×40 mm and four circles with the radius of 15 mm around the rectangle. The camera is an industrial camera (IDT OS10-V3-4K) with the maximum resolution of 9 million pixels and the maximum frame rate of 1000 fps. The camera lens (Kowa Company, Ltd, Japan) is with a focal length of 16 mm. The illumination device is an incandescent lamp of 60 W.

In order to verify the precision of the method provided herein, the method is used to measure a displacement and a planar motion trajectory in a frequency range of 0.5-10 Hz. Table 1 shows the measurement results of a motion of a low-frequency two-component working table using the method provided herein and a laser interferometric method in a single peak displacement range of 2.5-80 mm, respectively. Table 1 shows that the measurement results of the monocular vision method and the laser interferometric method are similar; a maximum relative deviation is about 0.1%; and a maximum difference of a phase difference is less than 0.4°.

TABLE 1

Measurement results of a displacement of a planar motion using the monocular vision method and the laser interferometric method

| Monocular vision method | | | |
| --- | --- | --- | --- |
| Frequency | $S_X$ (mm) | $S_Y$ (mm) | $P_D$ (°) |
| 0.5 | 79.719 | 80.089 | 45.411 |
| 0.8 | 80.430 | 80.795 | 44.710 |
| 1 | 80.458 | 80.822 | 44.566 |
| 2 | 62.296 | 62.545 | 44.673 |
| 5 | 10.014 | 10.015 | 44.254 |
| 8 | 3.938 | 3.949 | 44.379 |
| 10 | 2.520 | 2.529 | 44.510 |
| Laser interferometric method | | | |
| Frequency | $S_X$ (mm) | $S_Y$ (mm) | $P_D$ (°) |
| 0.5 | 79.700 | 80.017 | 44.615 |
| 0.8 | 80.394 | 80.802 | 44.371 |
| 1 | 80.484 | 80.845 | 44.487 |
| 2 | 62.315 | 62.552 | 44.322 |
| 5 | 10.013 | 10.014 | 44.522 |
| 8 | 3.936 | 3.948 | 44.351 |
| 10 | 2.518 | 2.529 | 44.396 |

Figure 4:
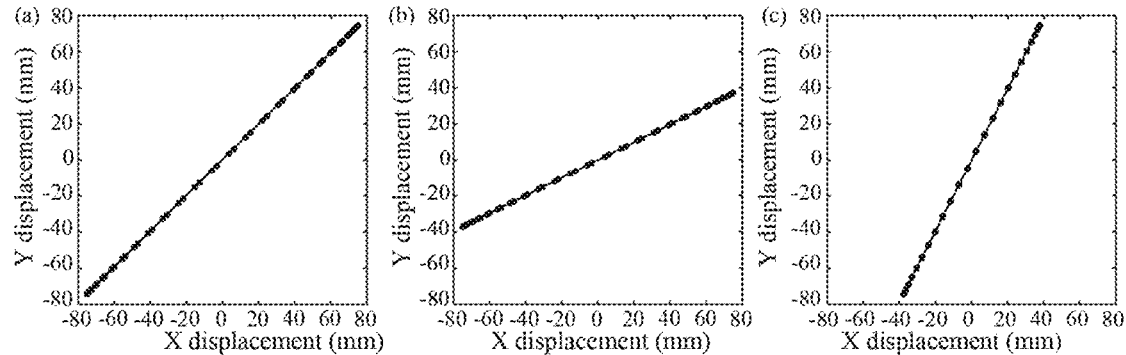
FIG. 4 shows a measurement result of a displacement and a trajectory of a motion of a working surface of a low-frequency two-component shaker in accordance with an embodiment of the present disclosure.
Figure 5:
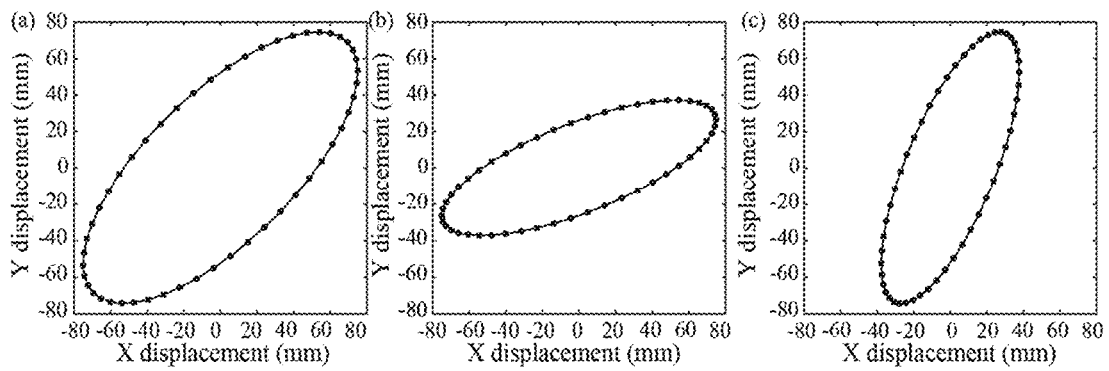
FIG. 5 shows a measurement result of a displacement and a trajectory of a motion of a working surface of a low-frequency two-component shaker in accordance with an embodiment of the present disclosure.
Figure 6:
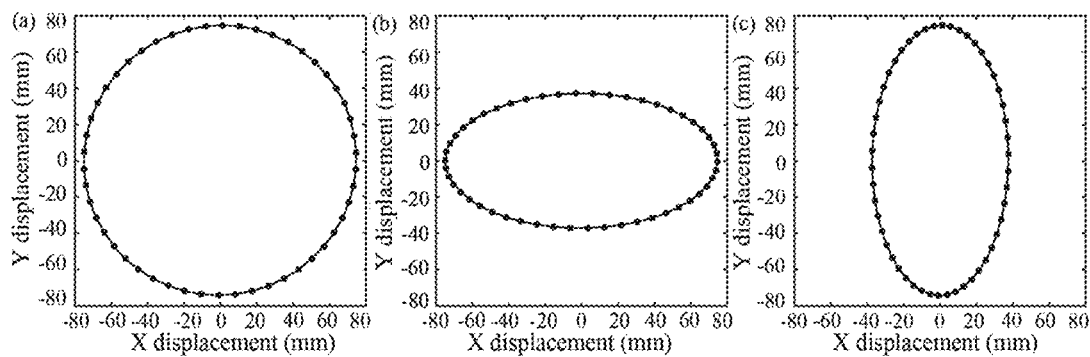
FIG. 6 shows a measurement result of a displacement and a trajectory of a motion of a working surface of a low-frequency two-component shaker in accordance with an embodiment of the present disclosure.

FIGS. 4-6 respectively show a measurement result of a displacement and a trajectory of a motion of the working surface of the low-frequency two-component shaker. The measurement result shown in FIG. 4 is three linear trajectories: $S_X$=81.057 mm, $S_Y$=80.905 mm and $P_D$=0.063°; $S_X$=80.576 mm, $S_Y$=40.047 mm and $P_D$=−0.014°; $S_X$=40.832 mm, $S_Y$=79.866 mm and $P_D$=0.002°. The measurement result shown in FIG. 5 is three elliptical trajectories: $S_X$=80.778 mm, $S_Y$=79.942 mm and $P_D$=44.404°; $S_X$=80.322 mm, $S_Y$=40.047 mm and $P_D$=44.538°; $S_X$=40.681 mm, $S_Y$=79.841 mm and $P_D$=44.048°. The measurement result shown in FIG. 6 is a circular trajectory and two elliptical trajectories: $S_X$=80.094 mm, $S_Y$=79.841 mm and $P_D$=89.991°; $S_X$=80.120 mm, $S_Y$=39.997 mm and $P_D$=89.277°; $S_X$=40.123 mm, $S_Y$=79.892 mm and $P_D$=88.346°.

The embodiments mentioned above are illustrative, and are not intended to limit the present disclosure. Any replacements, improvements and modifications made by those skilled in the art without departing from the spirit of this disclosure should fall within the scope of the present application defined by the appended claims.

What is claimed is:

1. A method for measuring a displacement and a trajectory of a planar motion based on monocular vision, comprising:
   (S1) fixing a high-contrast feature mark consisting of a rectangle and four circles around the rectangle on a working surface of a low-frequency two-component shaker such that a displacement of the rectangle in the high-contrast feature mark is consistent with a displacement of the working surface; and collecting a sequence image of a motion of the high-contrast feature mark using a camera;

(S2) extracting a sub-pixel coordinate of a feature edge of a linear motion of the sequence image of the high-contrast feature mark in an X direction and a Y direction using a Zernike moment-based sub-pixel edge detection method; and according to a relationship between a pixel coordinate and a world coordinate of an image determined through calibration using the camera, converting the sub-pixel coordinate of the feature edge into a corresponding world coordinate;

(S3) respectively performing least-square fitting on the world coordinate of the feature edge of the linear motion in the X direction and Y direction to obtain a straight line of the feature edge; selecting a feature edge of the motion of the sequence image of the high-contrast feature mark at a zero position of the working surface as a zero-displacement reference edge; calculating a distance between the feature edge of the linear motion of the sequence image and the zero-displacement reference edge to obtain a displacement of the working surface in the X direction and a displacement of the working surface in the Y direction; and (S4) obtaining a planar motion trajectory of the working surface according to the displacement of the working surface in the X direction and the displacement of the working surface in the Y direction; and saving and displaying a measurement result of the displacement and the planar motion trajectory of the working surface.

2. The method of claim 1, wherein the extraction of the feature edge of the linear motion of the sequence image in the X direction and the Y direction comprises:

(1) determining a rectangular region in the sequence image of the high-contrast feature mark;
wherein template matching is adopted to determine four circular regions in the sequence image of the high-contrast feature mark to improve stability and precision in extracting the feature edge of the linear motion; the rectangle is located in a region of interest formed by centers of the four circular regions; and the feature edge is extracted in the region of interest to avoid a disturbance from an edge with similar background;

(2) extracting a sub-pixel of an edge point of a long edge and a short edge of the rectangle;
extracting the edge point of the long edge and the short edge of a pixel-level rectangle of a sequence image $F_j(x,y)$ of the motion of the high-contrast feature mark using Canny operator, where $j=1, 2, \ldots, N$, and N is the number of collected sequence image;
obtaining a position error compensation of the long edge and the short edge of the rectangle through calculating Zernike moment of the sequence image $F_j(x,y)$ to obtain a sub-pixel coordinate of the long edge and the short edge of the rectangle; and
converting the sub-pixel coordinate of the long edge and the short edge of the rectangle into a corresponding world coordinate according to the relationship between the pixel coordinate and the world coordinate of the image; and (3) fitting the feature edge of the linear motion in the X direction and the Y direction;
respectively fitting the world coordinate of the feature edge of the X direction and the Y direction based on the least squares principle to obtain a straight line $\{l_{j, X}\}$ of the feature edge of the linear motion in the X direction and a straight line $\{l_{j, Y}\}$ of the feature edge of the linear motion in the Y direction, where the sub-pixel coordinate of the long edge and the short edge of the rectangle is the feature edge of the linear motion in the X direction and the Y direction, respectively, and $l_{j, X}$ and $l_{j, Y}$ are equivalent edges of two long edges and two short edges of the rectangle in the sequence image $F_j(x,y)$, respectively; and obtaining a straight line $l_{r, X}$ of the feature edge of linear motion in the X direction and a straight line $l_{r, Y}$ of the feature edge of linear motion in the Y direction of an image $F_r(x, y)$ of the high-contrast feature mark at the zero position of the working surface.

3. The method of claim 2, wherein a motion of the working surface of the low-frequency two-component shaker is obtained by decoupling an edge displacement in the X direction and the Y direction; and the planar motion is described as a displacement $s_X(t)$ in the X direction and a displacement $s_Y(t)$ in the Y direction:

$$\begin{cases} s_X(t) = \hat{s}_X \cos(\omega_v t + \varphi_X) \\ s_Y(t) = \hat{s}_Y \cos(\omega_v t + \varphi_Y) \end{cases} ; \qquad (1)$$

wherein, $\omega_v$ is an angular frequency of vibration; $\hat{s}_X$ and $\hat{s}_Y$ are peak values of the displacement $s_X(t)$ and the displacement $s_Y(t)$, respectively; and $\varphi_X$ and $\varphi_Y$ are initial phases of the displacement $s_X(t)$ and the displacement $s_Y(t)$, respectively;

the straight line $l_{r, X}$ and the straight line $l_{r, Y}$ of the feature edge of the image $F_r(x, y)$ are selected as the zero-displacement reference edge; a distance $d_{j, X}$ between the straight line $l_{j, X}$ of the feature edge of the image $F_j(x,y)$ and a corresponding edge of the image $F_r(x, y)$ is calculated as the displacement $s_X(t_j)$ at a collecting moment $t_j$; a distance $d_{j, Y}$ between the straight line $l_{j, Y}$ of the feature edge of the image $F_j(x,y)$ and a corresponding edge of the mark image $F_r(x, y)$ is calculated as the displacement $S_Y(t_j)$ at the collecting moment $t_j$.

4. The method of claim 3, wherein the displacement $s_X(t_j)$ and the displacement $s_Y(t_j)$ at the collecting moment $t_j$ are respectively fitted using a sine-approximation method shown as follows:

$$\begin{cases} s_X(t_j) = A_X \cos(\omega_v t_j) - B_X \sin(\omega_v t_j) + C_X \\ s_Y(t_j) = A_Y \cos(\omega_v t_j) - B_Y \sin(\omega_v t_j) + C_Y \end{cases} ; \qquad (2)$$

wherein parameters Ax, Bx, Cx, Ay, By and Cy are obtained by solving N corresponding equations, respectively; the peak value $\hat{s}_X$ and the initial phase $\varphi_X$ of the displacement of the planar motion in the X direction and the peak value $\hat{s}_Y$ and the initial phase $\varphi_Y$ of the planar motion in the Y direction are obtained as follows:

$$\begin{cases} \hat{s}_X = \sqrt{A_X^2 + B_X^2}, \varphi_X = \arctan(B_X/A_X) \cdot 180/\pi \\ \hat{s}_Y = \sqrt{A_Y^2 + B_Y^2}, \varphi_Y = \arctan(B_Y/A_Y) \cdot 180/\pi \end{cases} ; \qquad (3)$$

a phase difference $P_D$ is defined as follows:

$$P_D = |\varphi_X - \varphi_Y| \qquad (4);$$

when the phase difference $P_D$ is 0° or 180°, the planer motion provided by the working surface has a linear trajectory; if and only if $\hat{s}_X = \hat{s}_Y$ and the phase difference $P_D$ is 90°, the planar motion provided by the working surface has a circular trajectory; and planar motions under other conditions all have an elliptical trajectory.

* * * * *